United States Patent
Yuen et al.

(10) Patent No.: US 8,272,011 B2
(45) Date of Patent: Sep. 18, 2012

(54) METHOD AND SYSTEM FOR DISPLAYING ADVERTISEMENTS BETWEEN SCHEDULE LISTINGS

(75) Inventors: Henry C. Yuen, Pasadena, CA (US); Roy J. Mankovitz, Calabasas, CA (US); Daniel S. Kwoh, La Canada/Flintridge, CA (US); Elsie Y. Leung, South Pasadena, CA (US)

(73) Assignee: Index Systems, Inc., Tortola (VG)

( * ) Notice: Subject to any disclaimer, the term of this patent is extended or adjusted under 35 U.S.C. 154(b) by 0 days.

(21) Appl. No.: 12/777,732

(22) Filed: May 11, 2010

(65) Prior Publication Data

US 2010/0223643 A1    Sep. 2, 2010

Related U.S. Application Data

(63) Continuation of application No. 10/401,301, filed on Mar. 27, 2003, which is a continuation of application No. 09/284,894, filed as application No. PCT/US97/23852 on Dec. 19, 1997, now Pat. No. 6,687,906.

(60) Provisional application No. 60/034,784, filed on Dec. 19, 1996.

(51) Int. Cl.
*G06F 3/00* (2006.01)
*G06F 13/00* (2006.01)
*H04N 5/445* (2011.01)

(52) U.S. Cl. .............. 725/42; 725/34; 725/35; 725/36; 725/40; 725/41; 725/43; 725/44; 725/45; 725/47; 725/48; 725/49; 725/50; 725/51; 725/52; 725/53; 725/59; 725/60; 725/61

(58) Field of Classification Search .............. 725/34–36, 725/40–53, 59–61
See application file for complete search history.

(56) References Cited

U.S. PATENT DOCUMENTS

| | | | |
|---|---|---|---|
| 2,200,935 A | 5/1940 | Rodriguez |
| 3,153,543 A | 10/1964 | Magyar |
| 3,235,282 A | 2/1966 | Bostick |
| 3,440,427 A | 4/1969 | Kammer |
| 3,492,577 A | 1/1970 | Reiter et al. |
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |

(Continued)

FOREIGN PATENT DOCUMENTS

AU    731010    7/1998

(Continued)

OTHER PUBLICATIONS

U.S. Appl. No. 09/330,792, filed Jun. 11, 1999, Knudson et al.

(Continued)

*Primary Examiner* — Jason Salce
(74) *Attorney, Agent, or Firm* — Ropes & Gray LLP (57) ABSTRACT

In one embodiment, the invention is a system and method for simultaneously displaying advertisements with an electronic program guide (EPG). The system displays television schedule information in rows of schedule information items including the time and channel for least a portion of the displayed television schedule information items. An advertisement is selected for display from a plurality of advertisements, and the selected advertisement is displayed between two rows of the schedule information items simultaneously with the displayed television schedule information items.

20 Claims, 2 Drawing Sheets

U.S. PATENT DOCUMENTS

| | | |
|---|---|---|
| 3,990,713 A | 11/1976 | Hokanson |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,154,850 A | 5/1979 | Morgan et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,234,204 A | 11/1980 | Tibbals |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,313,124 A | 1/1982 | Hara |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,345,262 A | 8/1982 | Shirato et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,458,333 A | 7/1984 | Smith |
| 4,458,907 A | 7/1984 | Meredith |
| 4,459,600 A | 7/1984 | Sato et al. |
| 4,463,359 A | 7/1984 | Ayata et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,608,577 A | 8/1986 | Hori |
| 4,608,859 A | 9/1986 | Rockley |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| 4,723,129 A | 2/1988 | Endo et al. |
| RE32,632 E | 3/1988 | Atkinson |
| 4,740,796 A | 4/1988 | Endo et al. |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,799,702 A | 1/1989 | Wang |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |

| | | |
|---|---|---|
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,959,719 A | 9/1990 | Strubbe et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,006 A | 2/1991 | Wood |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,008,853 A | 4/1991 | Bly et al. |
| 5,014,125 A | 5/1991 | Pocock et al. |
| 5,027,400 A | 6/1991 | Baji et al. |
| 5,031,045 A | 7/1991 | Kawasaki |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto et al. |
| 5,083,800 A | 1/1992 | Lockton |
| 5,090,049 A | 2/1992 | Chen |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,148,154 A | 9/1992 | Mackay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,019 A | 11/1992 | Emanuel |
| 5,161,023 A | 11/1992 | Keenan |
| 5,162,905 A | 11/1992 | Itoh et al. |
| 5,170,388 A | 12/1992 | Endoh et al. |
| 5,172,111 A | 12/1992 | Olivo, Jr. |
| 5,172,413 A | 12/1992 | Bradley et al. |
| 5,177,604 A | 1/1993 | Martinez |
| 5,179,439 A | 1/1993 | Hashimoto et al. |
| 5,179,654 A | 1/1993 | Richards et al. |
| 5,189,630 A | 2/1993 | Barstow et al. |
| 5,191,423 A | 3/1993 | Yoshida et al. |
| 5,195,092 A | 3/1993 | Wilson et al. |
| 5,195,134 A | 3/1993 | Inoue |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,262,860 A | 11/1993 | Fitzpatrick et al. |
| 5,283,639 A | 2/1994 | Esch et al. |
| 5,283,819 A | 2/1994 | Glick et al. |
| 5,285,265 A | 2/1994 | Choi |
| 5,285,278 A | 2/1994 | Holman |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,396,546 A | 3/1995 | Remillard |
| 5,398,074 A | 3/1995 | Duffield et al. |
| 5,398,138 A | 3/1995 | Tomita |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,419,570 A | 5/1995 | Bollotte |
| 5,423,555 A | 6/1995 | Kidrin |
| 5,424,770 A | 6/1995 | Schmelzer et al. |
| 5,425,101 A | 6/1995 | Woo et al. |
| 5,426,555 A | 6/1995 | Lundquist |
| 5,432,561 A | 7/1995 | Strubbe |
| 5,434,625 A | 7/1995 | Willis |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,444,499 A | 8/1995 | Saitoh et al. |
| 5,446,919 A | 8/1995 | Wilkins |
| 5,452,012 A | 9/1995 | Saitoh |
| 5,453,796 A | 9/1995 | Duffield et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,473,442 A | 12/1995 | Kim et al. |
| 5,477,262 A | 12/1995 | Banker et al. |
| 5,479,266 A | 12/1995 | Young et al. |

| Patent No. | Date | Inventor(s) | | Patent No. | Date | Inventor(s) |
|---|---|---|---|---|---|---|
| 5,479,268 A | 12/1995 | Young et al. | | 5,635,989 A | 6/1997 | Rothmuller |
| 5,479,497 A | 12/1995 | Kovarik | | 5,636,346 A | 6/1997 | Saxe |
| 5,481,296 A | 1/1996 | Cragun et al. | | 5,640,501 A | 6/1997 | Turpin |
| 5,483,278 A | 1/1996 | Strubbe et al. | | 5,640,577 A | 6/1997 | Scharmer |
| 5,485,197 A | 1/1996 | Hoarty | | 5,642,153 A | 6/1997 | Chaney et al. |
| 5,485,219 A | 1/1996 | Woo | | 5,648,813 A | 7/1997 | Tanigawa et al. |
| 5,485,221 A | 1/1996 | Banker et al. | | 5,648,824 A | 7/1997 | Dunn et al. |
| 5,488,409 A | 1/1996 | Yuen et al. | | 5,650,826 A | 7/1997 | Eitz |
| 5,495,295 A | 2/1996 | Long | | 5,650,831 A | 7/1997 | Farwell |
| 5,502,504 A | 3/1996 | Marshall et al. | | 5,652,613 A | 7/1997 | Lazarus et al. |
| 5,515,098 A | 5/1996 | Carles | | 5,652,615 A | 7/1997 | Bryant et al. |
| 5,515,106 A | 5/1996 | Chaney et al. | | 5,654,748 A | 8/1997 | Matthews, III |
| 5,515,511 A | 5/1996 | Nguyen et al. | | 5,654,886 A | 8/1997 | Zereski, Jr. et al. |
| 5,517,254 A | 5/1996 | Monta et al. | | 5,657,072 A | 8/1997 | Aristides et al. |
| 5,523,794 A | 6/1996 | Mankovitz et al. | | 5,657,091 A | 8/1997 | Bertram |
| 5,523,796 A | 6/1996 | Marshall et al. | | 5,659,350 A | 8/1997 | Hendricks et al. |
| 5,524,195 A | 6/1996 | Clanton, III et al. | | 5,659,366 A | 8/1997 | Kerman |
| 5,526,034 A | 6/1996 | Hoarty et al. | | 5,661,516 A | 8/1997 | Carles |
| 5,528,304 A | 6/1996 | Cherrick et al. | | 5,661,517 A | 8/1997 | Budow et al. |
| 5,532,735 A | 7/1996 | Blahut et al. | | 5,663,757 A | 9/1997 | Morales |
| 5,532,754 A | 7/1996 | Young et al. | | 5,664,111 A | 9/1997 | Nahan et al. |
| 5,534,911 A | 7/1996 | Levitan | | 5,666,293 A | 9/1997 | Metz et al. |
| 5,537,141 A | 7/1996 | Harper et al. | | 5,666,498 A | 9/1997 | Amro |
| 5,539,479 A | 7/1996 | Bertram | | 5,666,645 A | 9/1997 | Thomas et al. |
| 5,539,822 A | 7/1996 | Lett | | 5,671,276 A | 9/1997 | Eyer et al. |
| 5,541,662 A | 7/1996 | Adams et al. | | 5,671,411 A | 9/1997 | Watts et al. |
| 5,541,738 A | 7/1996 | Mankovitz | | 5,675,390 A | 10/1997 | Schindler et al. |
| 5,546,521 A | 8/1996 | Martinez | | 5,675,752 A | 10/1997 | Scott et al. |
| 5,550,576 A | 8/1996 | Klosterman | | 5,677,708 A | 10/1997 | Matthews, III et al. |
| 5,557,338 A | 9/1996 | Maze et al. | | 5,677,981 A | 10/1997 | Kato et al. |
| 5,557,721 A | 9/1996 | Fite et al. | | 5,682,195 A | 10/1997 | Hendricks et al. |
| 5,559,548 A | 9/1996 | Davis et al. | | 5,682,206 A | 10/1997 | Wehmeyer et al. |
| 5,559,549 A | 9/1996 | Hendricks et al. | | 5,684,525 A | 11/1997 | Klosterman |
| 5,559,550 A | 9/1996 | Mankovitz | | 5,686,954 A | 11/1997 | Yoshinobu et al. |
| 5,559,942 A | 9/1996 | Gough et al. | | 5,687,331 A | 11/1997 | Volk et al. |
| 5,561,471 A | 10/1996 | Kim et al. | | 5,689,648 A | 11/1997 | Diaz et al. |
| 5,561,709 A | 10/1996 | Remillard | | 5,689,666 A | 11/1997 | Berquist et al. |
| 5,563,665 A | 10/1996 | Chang | | 5,692,214 A | 11/1997 | Levine |
| 5,570,295 A | 10/1996 | Isenberg et al. | | 5,694,163 A | 12/1997 | Harrison |
| 5,572,442 A | 11/1996 | Schulhof et al. | | 5,694,176 A | 12/1997 | Bruette et al. |
| 5,574,962 A | 11/1996 | Fardeau et al. | | 5,694,381 A | 12/1997 | Sako |
| 5,576,755 A | 11/1996 | Davis et al. | | 5,696,905 A | 12/1997 | Reimer et al. |
| 5,579,055 A * | 11/1996 | Hamilton et al. ............... 725/49 | | 5,699,052 A | 12/1997 | Miyahara |
| 5,581,479 A | 12/1996 | McLaughlin et al. | | 5,699,107 A | 12/1997 | Lawler et al. |
| 5,582,364 A | 12/1996 | Trulin et al. | | 5,699,125 A | 12/1997 | Rzeszewski et al. |
| 5,583,560 A * | 12/1996 | Florin et al. .................... 725/40 | | 5,708,478 A | 1/1998 | Tognazzini |
| 5,583,563 A | 12/1996 | Wanderscheid et al. | | 5,710,601 A | 1/1998 | Marshall et al. |
| 5,585,838 A | 12/1996 | Lawler et al. | | 5,710,815 A | 1/1998 | Ming et al. |
| 5,585,865 A | 12/1996 | Amano et al. | | 5,710,884 A | 1/1998 | Dedrick |
| 5,585,866 A | 12/1996 | Miller et al. | | 5,715,314 A | 2/1998 | Payne et al. |
| 5,589,892 A | 12/1996 | Knee et al. | | 5,715,399 A | 2/1998 | Bezos |
| 5,592,551 A | 1/1997 | Lett et al. | | 5,717,452 A | 2/1998 | Janin et al. |
| 5,594,490 A | 1/1997 | Dawson et al. | | 5,717,923 A | 2/1998 | Dedrick |
| 5,594,509 A | 1/1997 | Florin et al. | | 5,721,829 A | 2/1998 | Dunn et al. |
| 5,594,661 A | 1/1997 | Bruner et al. | | 5,722,041 A | 2/1998 | Freadman |
| 5,596,373 A | 1/1997 | White et al. | | 5,724,103 A | 3/1998 | Batchelor |
| 5,600,364 A | 2/1997 | Hendricks et al. | | 5,724,521 A | 3/1998 | Dedrick |
| 5,600,366 A | 2/1997 | Schulman | | 5,724,525 A | 3/1998 | Beyers, II et al. |
| 5,600,573 A | 2/1997 | Hendricks et al. | | 5,724,567 A | 3/1998 | Rose et al. |
| 5,602,582 A | 2/1997 | Wanderscheid et al. | | 5,727,060 A | 3/1998 | Young |
| 5,602,596 A | 2/1997 | Claussen et al. | | 5,727,163 A | 3/1998 | Bezos |
| 5,602,597 A | 2/1997 | Bertram | | 5,731,844 A | 3/1998 | Rauch et al. |
| 5,602,598 A | 2/1997 | Shintani | | 5,734,444 A | 3/1998 | Yoshinobu |
| 5,606,374 A | 2/1997 | Bertram | | 5,734,853 A | 3/1998 | Hendricks et al. |
| 5,610,653 A | 3/1997 | Abecassis | | 5,734,893 A | 3/1998 | Li et al. |
| 5,610,664 A | 3/1997 | Bobert | | 5,737,028 A | 4/1998 | Bertram et al. |
| 5,617,565 A | 4/1997 | Augenbraun et al. | | 5,737,030 A | 4/1998 | Hong et al. |
| 5,619,247 A | 4/1997 | Russo | | 5,740,549 A | 4/1998 | Reilly et al. |
| 5,619,249 A | 4/1997 | Billock et al. | | 5,745,710 A | 4/1998 | Clanton et al. |
| 5,619,274 A | 4/1997 | Roop et al. | | 5,751,282 A | 5/1998 | Girard et al. |
| 5,621,456 A | 4/1997 | Florin et al. | | 5,752,159 A | 5/1998 | Faust et al. |
| 5,623,613 A | 4/1997 | Rowe et al. | | 5,752,160 A | 5/1998 | Dunn |
| 5,627,940 A | 5/1997 | Rohra et al. | | 5,754,258 A | 5/1998 | Hanaya et al. |
| 5,629,733 A | 5/1997 | Youman et al. | | 5,754,771 A | 5/1998 | Epperson et al. |
| 5,630,119 A | 5/1997 | Aristides et al. | | 5,754,939 A | 5/1998 | Herz et al. |
| 5,631,995 A | 5/1997 | Weissensteiner et al. | | 5,757,417 A | 5/1998 | Aras et al. |
| 5,633,683 A | 5/1997 | Rosengren et al. | | 5,758,257 A | 5/1998 | Herz et al. |
| 5,635,978 A | 6/1997 | Alten et al. | | 5,758,259 A | 5/1998 | Lawler |
| 5,635,979 A | 6/1997 | Kostreski et al. | | 5,760,821 A | 6/1998 | Ellis et al. |

| | | | | | | |
|---|---|---|---|---|---|---|
| 5,761,372 A | 6/1998 | Yoshinobu et al. | | 5,872,588 A | 2/1999 | Aras et al. |
| 5,761,601 A | 6/1998 | Nemirofsky et al. | | 5,873,660 A | 2/1999 | Walsh et al. |
| 5,761,606 A | 6/1998 | Wolzien | | 5,874,985 A | 2/1999 | Matthews, III |
| 5,768,528 A | 6/1998 | Stumm | | 5,875,108 A | 2/1999 | Hoffberg et al. |
| 5,774,170 A | 6/1998 | Hite et al. | | 5,877,906 A | 3/1999 | Nagasawa et al. |
| 5,774,357 A | 6/1998 | Hoffberg et al. | | 5,880,768 A | 3/1999 | Lemmons et al. |
| 5,774,534 A | 6/1998 | Mayer | | 5,883,677 A | 3/1999 | Hofmann |
| 5,774,664 A | 6/1998 | Hidary et al. | | 5,886,691 A | 3/1999 | Furuya et al. |
| 5,774,887 A | 6/1998 | Wolff et al. | | 5,886,731 A | 3/1999 | Ebisawa |
| 5,778,181 A | 7/1998 | Hidary et al. | | 5,889,950 A | 3/1999 | Kuzma |
| 5,778,182 A | 7/1998 | Cathey et al. | | 5,892,498 A | 4/1999 | Marshall et al. |
| 5,781,226 A | 7/1998 | Sheehan | | 5,892,535 A | 4/1999 | Allen et al. |
| 5,781,245 A | 7/1998 | Van Der Weij et al. | | 5,892,767 A | 4/1999 | Bell et al. |
| 5,781,246 A | 7/1998 | Alten et al. | | 5,900,905 A | 5/1999 | Shoff et al. |
| 5,781,734 A | 7/1998 | Ohno et al. | | 5,903,314 A | 5/1999 | Niijima et al. |
| 5,784,258 A | 7/1998 | Quinn | | 5,903,545 A | 5/1999 | Sabourin et al. |
| 5,790,201 A | 8/1998 | Antos | | 5,903,816 A | 5/1999 | Broadwin et al. |
| 5,790,202 A | 8/1998 | Kummer et al. | | 5,905,497 A | 5/1999 | Vaughan et al. |
| 5,790,426 A | 8/1998 | Robinson | | 5,907,322 A | 5/1999 | Kelly et al. |
| 5,790,753 A | 8/1998 | Krishnamoorthy et al. | | 5,907,323 A | 5/1999 | Lawler et al. |
| 5,793,364 A | 8/1998 | Bolanos et al. | | 5,907,366 A | 5/1999 | Farmer et al. |
| 5,793,438 A | 8/1998 | Bedard | | 5,914,712 A | 6/1999 | Sartain et al. |
| 5,793,964 A | 8/1998 | Rogers et al. | | 5,914,746 A | 6/1999 | Matthews, III et al. |
| 5,793,972 A | 8/1998 | Shane et al. | | 5,917,481 A | 6/1999 | Rzeszewski et al. |
| 5,797,011 A | 8/1998 | Kroll et al. | | 5,917,830 A | 6/1999 | Chen et al. |
| 5,798,785 A | 8/1998 | Hendricks et al. | | 5,918,014 A | 6/1999 | Robinson |
| 5,801,747 A | 9/1998 | Bedard | | 5,920,700 A | 7/1999 | Gordon et al. |
| 5,801,785 A | 9/1998 | Crump et al. | | 5,923,848 A | 7/1999 | Goodhand et al. |
| 5,801,787 A | 9/1998 | Schein et al. | | 5,929,849 A | 7/1999 | Kikinis |
| 5,802,284 A | 9/1998 | Karlton et al. | | 5,929,850 A | 7/1999 | Broadwin et al. |
| 5,805,154 A | 9/1998 | Brown | | 5,929,932 A | 7/1999 | Otsuki et al. |
| 5,805,167 A | 9/1998 | van Cruyningen | | 5,931,905 A | 8/1999 | Hashimoto et al. |
| 5,805,235 A | 9/1998 | Bedard | | 5,936,614 A | 8/1999 | An et al. |
| 5,805,763 A | 9/1998 | Lawler et al. | | 5,936,679 A | 8/1999 | Kasahara et al. |
| 5,805,804 A | 9/1998 | Laursen et al. | | 5,937,160 A | 8/1999 | Davis et al. |
| 5,805,806 A | 9/1998 | McArthur | | 5,940,073 A | 8/1999 | Klosterman et al. |
| 5,808,608 A | 9/1998 | Young et al. | | 5,940,572 A | 8/1999 | Balaban et al. |
| 5,808,694 A | 9/1998 | Usui et al. | | 5,940,614 A | 8/1999 | Allen et al. |
| 5,809,204 A | 9/1998 | Young et al. | | 5,945,988 A | 8/1999 | Williams et al. |
| 5,809,214 A | 9/1998 | Nureki et al. | | 5,946,386 A | 8/1999 | Rogers et al. |
| 5,809,242 A | 9/1998 | Shaw et al. | | 5,949,954 A | 9/1999 | Young et al. |
| 5,812,205 A | 9/1998 | Milnes et al. | | 5,951,642 A | 9/1999 | Onoe et al. |
| 5,815,145 A | 9/1998 | Matthews, III | | 5,955,988 A | 9/1999 | Blonstein et al. |
| 5,815,671 A | 9/1998 | Morrison | | 5,959,688 A | 9/1999 | Schein et al. |
| 5,818,438 A | 10/1998 | Howe et al. | | 5,960,411 A | 9/1999 | Hartman et al. |
| 5,818,439 A | 10/1998 | Nagasaka et al. | | 5,973,683 A | 10/1999 | Cragun et al. |
| 5,818,441 A | 10/1998 | Throckmorton et al. | | 5,974,222 A | 10/1999 | Yuen et al. |
| 5,818,511 A | 10/1998 | Farry et al. | | 5,977,964 A | 11/1999 | Williams et al. |
| 5,818,541 A | 10/1998 | Matsuura et al. | | 5,986,650 A | 11/1999 | Ellis et al. |
| 5,818,935 A | 10/1998 | Maa | | 5,988,078 A | 11/1999 | Levine |
| 5,819,019 A | 10/1998 | Nelson | | 5,990,890 A | 11/1999 | Etheredge |
| 5,819,156 A | 10/1998 | Belmont | | 5,990,927 A | 11/1999 | Hendricks et al. |
| 5,819,284 A | 10/1998 | Farber et al. | | 5,991,799 A | 11/1999 | Yen et al. |
| 5,822,123 A | 10/1998 | Davis et al. | | 5,999,912 A | 12/1999 | Wodarz et al. |
| 5,828,402 A | 10/1998 | Collings | | 6,002,393 A | 12/1999 | Hite et al. |
| 5,828,419 A | 10/1998 | Bruette et al. | | 6,002,394 A | 12/1999 | Schein et al. |
| 5,828,420 A | 10/1998 | Marshall et al. | | 6,005,561 A | 12/1999 | Hawkins et al. |
| 5,828,839 A | 10/1998 | Moncreiff | | 6,005,562 A | 12/1999 | Shiga et al. |
| 5,828,945 A | 10/1998 | Klosterman | | 6,005,563 A | 12/1999 | White et al. |
| 5,830,068 A | 11/1998 | Brenner et al. | | 6,005,565 A | 12/1999 | Legall et al. |
| 5,832,223 A | 11/1998 | Hara et al. | | 6,005,597 A | 12/1999 | Barrett et al. |
| 5,833,468 A | 11/1998 | Guy et al. | | 6,006,257 A | 12/1999 | Slezak |
| 5,835,717 A | 11/1998 | Karlton et al. | | 6,008,802 A | 12/1999 | Iki |
| 5,838,314 A | 11/1998 | Neel et al. | | 6,008,803 A | 12/1999 | Rowe et al. |
| 5,838,383 A | 11/1998 | Chimoto et al. | | 6,011,546 A | 1/2000 | Bertram |
| 5,842,010 A | 11/1998 | Jain et al. | | 6,014,137 A | 1/2000 | Burns |
| 5,842,199 A | 11/1998 | Miller et al. | | 6,014,184 A | 1/2000 | Knee et al. |
| 5,844,552 A | 12/1998 | Gaughan et al. | | 6,014,502 A | 1/2000 | Moraes |
| 5,844,620 A | 12/1998 | Coleman et al. | | 6,016,141 A | 1/2000 | Knudson et al. |
| 5,848,352 A | 12/1998 | Dougherty et al. | | 6,018,372 A | 1/2000 | Etheredge |
| 5,848,396 A | 12/1998 | Gerace | | 6,018,768 A | 1/2000 | Ullman et al. |
| 5,848,397 A | 12/1998 | Marsh et al. | | 6,020,883 A | 2/2000 | Herz et al. |
| 5,850,218 A | 12/1998 | LaJoie et al. | | 6,020,929 A | 2/2000 | Marshall et al. |
| 5,852,437 A | 12/1998 | Wugofski et al. | | 6,023,267 A | 2/2000 | Chapuis et al. |
| 5,861,881 A | 1/1999 | Freeman et al. | | 6,025,837 A * | 2/2000 | Matthews et al. ............ 715/721 |
| 5,861,906 A | 1/1999 | Dunn et al. | | 6,025,886 A | 2/2000 | Koda |
| 5,862,292 A | 1/1999 | Kubota et al. | | 6,027,198 A | 2/2000 | Tanaka et al. |
| 5,867,226 A | 2/1999 | Wehmeyer et al. | | 6,028,599 A | 2/2000 | Yuen et al. |
| 5,867,227 A | 2/1999 | Yamaguchi | | 6,029,045 A | 2/2000 | Picco et al. |

| | | | | | | |
|---|---|---|---|---|---|---|
| 6,029,195 | A | 2/2000 | Herz | 6,289,346 B1 | 9/2001 | Milewski et al. |
| 6,035,304 | A | 3/2000 | Machida et al. | 6,298,482 B1 | 10/2001 | Seidman et al. |
| 6,047,317 | A | 4/2000 | Bisdikian et al. | 6,311,877 B1 | 11/2001 | Yang |
| 6,049,824 | A | 4/2000 | Simonin | 6,312,336 B1 | 11/2001 | Handelman et al. |
| 6,052,145 | A | 4/2000 | Macrae et al. | 6,317,885 B1 | 11/2001 | Fries |
| 6,061,060 | A | 5/2000 | Berry et al. | 6,320,588 B1 | 11/2001 | Palmer et al. |
| 6,061,082 | A | 5/2000 | Park | 6,323,911 B1 | 11/2001 | Schein et al. |
| 6,061,097 | A | 5/2000 | Satterfield | 6,331,877 B1 | 12/2001 | Bennington et al. |
| 6,064,376 | A | 5/2000 | Berezowski et al. | 6,335,963 B1 | 1/2002 | Bosco |
| 6,064,980 | A | 5/2000 | Jacobi et al. | 6,341,195 B1 | 1/2002 | Mankovitz et al. |
| 6,067,303 | A | 5/2000 | Aaker et al. | 6,341,374 B1 | 1/2002 | Schein et al. |
| 6,067,561 | A | 5/2000 | Dillon | 6,342,926 B1 | 1/2002 | Hanafee et al. |
| 6,072,460 | A | 6/2000 | Marshall et al. | 6,348,033 B1 | 2/2002 | Catlett |
| 6,075,526 | A | 6/2000 | Rothmuller | 6,357,042 B2 | 3/2002 | Srinivasan et al. |
| 6,075,551 | A | 6/2000 | Berezowski et al. | 6,357,043 B1 | 3/2002 | Ellis et al. |
| 6,075,575 | A | 6/2000 | Schein et al. | 6,359,636 B1 | 3/2002 | Schindler et al. |
| 6,078,348 | A | 6/2000 | Klosterman et al. | 6,363,525 B1 | 3/2002 | Dougherty et al. |
| 6,081,750 | A | 6/2000 | Hoffberg et al. | 6,373,528 B1 | 4/2002 | Bennington et al. |
| 6,088,722 | A | 7/2000 | Herz et al. | 6,381,582 B1 | 4/2002 | Walker et al. |
| 6,091,883 | A | 7/2000 | Artigalas et al. | 6,388,714 B1 | 5/2002 | Schein et al. |
| 6,097,499 | A | 8/2000 | Casey et al. | 6,389,593 B1 | 5/2002 | Yamagishi |
| 6,098,065 | A | 8/2000 | Skillen et al. | 6,392,710 B1 | 5/2002 | Gonsalves et al. |
| 6,104,705 | A | 8/2000 | Ismail et al. | 6,396,546 B1 | 5/2002 | Alten et al. |
| 6,108,042 | A | 8/2000 | Adams et al. | 6,400,407 B1 | 6/2002 | Zigmond et al. |
| 6,111,614 | A | 8/2000 | Mugura et al. | 6,405,371 B1 | 6/2002 | Oosterhout et al. |
| 6,112,186 | A | 8/2000 | Bergh et al. | 6,408,437 B1 | 6/2002 | Hendricks et al. |
| 6,115,057 | A | 9/2000 | Kwoh et al. | 6,411,308 B1 | 6/2002 | Blonstein et al. |
| 6,118,492 | A | 9/2000 | Milnes et al. | 6,411,696 B1 | 6/2002 | Iverson et al. |
| 6,119,098 | A | 9/2000 | Guyot et al. | 6,412,110 B1 | 6/2002 | Schein et al. |
| 6,119,101 | A | 9/2000 | Peckover | 6,418,556 B1 | 7/2002 | Bennington et al. |
| 6,122,011 | A | 9/2000 | Dias et al. | 6,421,067 B1 | 7/2002 | Kamen et al. |
| 6,125,230 | A | 9/2000 | Yaginuma | 6,437,836 B1 | 8/2002 | Huang et al. |
| 6,133,909 | A | 10/2000 | Schein et al. | 6,446,261 B1 | 9/2002 | Rosser |
| 6,139,177 | A | 10/2000 | Venkatraman et al. | 6,453,471 B1 | 9/2002 | Klosterman |
| 6,141,003 | A | 10/2000 | Chor et al. | 6,463,585 B1 | 10/2002 | Hendricks et al. |
| 6,147,714 | A | 11/2000 | Terasawa et al. | 6,469,753 B1 | 10/2002 | Klosterman et al. |
| 6,147,715 | A | 11/2000 | Yuen et al. | 6,470,497 B1 | 10/2002 | Ellis et al. |
| 6,151,059 | A | 11/2000 | Schein et al. | 6,477,579 B1 | 11/2002 | Kunkel et al. |
| 6,151,643 | A | 11/2000 | Cheng et al. | 6,477,705 B1 | 11/2002 | Yuen et al. |
| 6,154,203 | A | 11/2000 | Yuen et al. | 6,486,920 B2 | 11/2002 | Arai et al. |
| 6,157,411 | A | 12/2000 | Williams et al. | 6,487,362 B1 | 11/2002 | Yuen et al. |
| 6,157,413 | A | 12/2000 | Hanafee et al. | 6,498,895 B2 | 12/2002 | Young et al. |
| 6,160,545 | A | 12/2000 | Eyer et al. | 6,505,348 B1 | 1/2003 | Knowles et al. |
| 6,160,546 | A | 12/2000 | Thompson et al. | 6,515,680 B1 | 2/2003 | Hendricks et al. |
| 6,160,570 | A | 12/2000 | Sitnik | 6,516,467 B1 | 2/2003 | Schindler et al. |
| 6,160,989 | A | 12/2000 | Hendricks et al. | 6,539,548 B1 | 3/2003 | Hendricks et al. |
| 6,163,316 | A | 12/2000 | Killian | 6,542,169 B1 | 4/2003 | Marshall et al. |
| 6,163,345 | A | 12/2000 | Noguchi et al. | 6,545,722 B1 | 4/2003 | Schultheiss et al. |
| 6,169,542 | B1 | 1/2001 | Hooks et al. | 6,546,556 B1 | 4/2003 | Kataoka et al. |
| 6,172,674 | B1 | 1/2001 | Etheredge | 6,564,378 B1 | 5/2003 | Satterfield et al. |
| 6,172,677 | B1 | 1/2001 | Stautner et al. | 6,564,379 B1 | 5/2003 | Knudson et al. |
| 6,173,271 | B1 | 1/2001 | Goodman et al. | 6,574,424 B1 | 6/2003 | Dimitri et al. |
| 6,177,931 | B1 | 1/2001 | Alexander et al. | 6,588,013 B1 | 7/2003 | Lumley et al. |
| 6,178,446 | B1 | 1/2001 | Gerszberg et al. | 6,600,364 B1 | 7/2003 | Liang et al. |
| 6,181,335 | B1 | 1/2001 | Hendricks et al. | 6,600,503 B2 | 7/2003 | Stautner et al. |
| 6,184,877 | B1 | 2/2001 | Dodson et al. | 6,606,128 B2 | 8/2003 | Hanafee et al. |
| 6,186,443 | B1 | 2/2001 | Shaffer | 6,622,306 B1 | 9/2003 | Kamada |
| 6,191,780 | B1 | 2/2001 | Martin et al. | 6,631,523 B1 | 10/2003 | Matthews, III et al. |
| 6,202,212 | B1 | 3/2001 | Sturgeon et al. | 6,651,251 B1 | 11/2003 | Shoff et al. |
| 6,209,129 | B1 | 3/2001 | Carr et al. | 6,660,503 B2 | 12/2003 | Kierulff |
| 6,209,130 | B1 | 3/2001 | Rector, Jr. et al. | 6,661,468 B2 | 12/2003 | Alten et al. |
| 6,212,553 | B1 | 4/2001 | Lee et al. | 6,665,869 B1 | 12/2003 | Ellis et al. |
| 6,216,264 | B1 | 4/2001 | Maze et al. | 6,675,386 B1 | 1/2004 | Hendricks et al. |
| 6,234,973 | B1 | 5/2001 | Meador et al. | 6,678,706 B1 | 1/2004 | Fishel |
| 6,239,794 | B1 | 5/2001 | Yuen et al. | 6,687,906 B1 | 2/2004 | Yuen et al. |
| 6,240,555 | B1 * | 5/2001 | Shoff et al. ............ 725/110 | 6,698,020 B1 | 2/2004 | Zigmond et al. |
| 6,253,203 | B1 | 6/2001 | O'Flaherty et al. | 6,732,369 B1 | 5/2004 | Leftwich et al. |
| 6,256,071 | B1 | 7/2001 | Hiroi | 6,738,978 B1 | 5/2004 | Hendricks et al. |
| 6,256,785 | B1 | 7/2001 | Klappert et al. | 6,742,183 B1 | 5/2004 | Reynolds et al. |
| 6,257,268 | B1 | 7/2001 | Hope et al. | 6,751,800 B1 | 6/2004 | Fukuda et al. |
| 6,262,721 | B1 | 7/2001 | Tsukidate et al. | 6,754,904 B1 | 6/2004 | Cooper et al. |
| 6,262,772 | B1 | 7/2001 | Shen et al. | 6,756,997 B1 | 6/2004 | Ward, III et al. |
| 6,263,501 | B1 | 7/2001 | Schein et al. | 6,757,906 B1 | 6/2004 | Look et al. |
| 6,263,507 | B1 | 7/2001 | Ahmad et al. | 6,769,128 B1 | 7/2004 | Knee et al. |
| 6,268,849 | B1 | 7/2001 | Boyer et al. | 6,799,326 B2 | 9/2004 | Boylan, III et al. |
| 6,275,268 | B1 | 8/2001 | Ellis et al. | 6,799,327 B1 | 9/2004 | Reynolds et al. |
| 6,279,157 | B1 | 8/2001 | Takasu | 6,828,993 B1 | 12/2004 | Hendricks et al. |
| 6,285,713 | B1 | 9/2001 | Nakaya et al. | 6,847,387 B2 | 1/2005 | Roth |
| 6,286,140 | B1 | 9/2001 | Ivanyi | 6,850,693 B2 | 2/2005 | Young et al. |

| | | |
|---|---|---|
| 6,857,131 B1 | 2/2005 | Yagawa et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,047,547 B2 | 5/2006 | Alten et al. |
| 7,047,550 B1 | 5/2006 | Yasukawa et al. |
| 7,058,635 B1 | 6/2006 | Shah-Nazaroff et al. |
| 7,069,576 B1 | 6/2006 | Knudson et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,266,833 B2 | 9/2007 | Ward, III et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,437,751 B2 | 10/2008 | Daniels |
| 7,480,929 B2 * | 1/2009 | Klosterman et al. ............ 725/44 |
| 7,493,641 B2 * | 2/2009 | Klosterman et al. ............ 725/44 |
| 7,552,459 B2 * | 6/2009 | Klosterman et al. ............ 725/42 |
| 2001/0001160 A1 | 5/2001 | Shoff et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0026496 A1 | 2/2002 | Boyer et al. |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0059599 A1 | 5/2002 | Schein et al. |
| 2002/0059602 A1 | 5/2002 | Macrae et al. |
| 2002/0073424 A1 | 6/2002 | Ward, III et al. |
| 2002/0083439 A1 | 6/2002 | Eldering |
| 2002/0092017 A1 | 7/2002 | Klosterman et al. |
| 2002/0112249 A1 | 8/2002 | Hendricks et al. |
| 2002/0120933 A1 | 8/2002 | Knudson et al. |
| 2002/0124249 A1 | 9/2002 | Shintani et al. |
| 2002/0138840 A1 | 9/2002 | Schein et al. |
| 2002/0153685 A1 | 10/2002 | Day et al. |
| 2002/0171686 A1 | 11/2002 | Kamen et al. |
| 2003/0005432 A1 | 1/2003 | Ellis et al. |
| 2003/0005445 A1 | 1/2003 | Schein et al. |
| 2003/0051241 A1 | 3/2003 | Klosterman et al. |
| 2003/0076347 A1 | 4/2003 | Barrett et al. |
| 2003/0110495 A1 | 6/2003 | Bennington et al. |
| 2003/0110499 A1 | 6/2003 | Knudson et al. |
| 2003/0115593 A1 | 6/2003 | Alten et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2004/0003407 A1 | 1/2004 | Hanafee et al. |
| 2004/0049787 A1 | 3/2004 | Maissel et al. |
| 2004/0078809 A1 | 4/2004 | Drazin |
| 2004/0078815 A1 | 4/2004 | Lemmons et al. |
| 2004/0111742 A1 | 6/2004 | Hendricks et al. |
| 2004/0139465 A1 | 7/2004 | Matthews et al. |
| 2004/0168189 A1 | 8/2004 | Reynolds et al. |
| 2004/0194131 A1 | 9/2004 | Ellis et al. |
| 2004/0194138 A1 | 9/2004 | Boylan, III et al. |
| 2004/0210935 A1 | 10/2004 | Schein et al. |
| 2004/0221310 A1 | 11/2004 | Herrington et al. |
| 2005/0010949 A1 | 1/2005 | Ward et al. |
| 2005/0015804 A1 | 1/2005 | LaJoie et al. |
| 2005/0015815 A1 | 1/2005 | Shoff et al. |
| 2005/0028201 A1 | 2/2005 | Klosterman et al. |
| 2005/0097622 A1 | 5/2005 | Zigmond et al. |
| 2005/0138660 A1 | 6/2005 | Boyer et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0204388 A1 | 9/2005 | Knudson et al. |
| 2005/0216936 A1 | 9/2005 | Knudson |
| 2005/0229214 A1 | 10/2005 | Young et al. |
| 2005/0229215 A1 | 10/2005 | Schein et al. |
| 2005/0235320 A1 | 10/2005 | Maze et al. |
| 2005/0244138 A1 | 11/2005 | O'Connor et al. |
| 2005/0278741 A1 | 12/2005 | Robarts et al. |
| 2005/0283796 A1 | 12/2005 | Flickinger |
| 2006/0037044 A1 | 2/2006 | Daniels |
| 2006/0248555 A1 | 11/2006 | Eldering |
| 2006/0277574 A1 | 12/2006 | Schein et al. |
| 2007/0016926 A1 | 1/2007 | Ward et al. |
| 2007/0033613 A1 | 2/2007 | Ward et al. |
| 2007/0162934 A1 | 7/2007 | Roop et al. |
| 2007/0186240 A1 | 8/2007 | Ward et al. |
| 2007/0234393 A1 | 10/2007 | Walker et al. |
| 2007/0271582 A1 | 11/2007 | Ellis et al. |
| 2008/0127263 A1 | 5/2008 | Klosterman et al. |
| 2008/0127264 A1 | 5/2008 | Klosterman et al. |
| 2008/0127265 A1 | 5/2008 | Ward et al. |
| 2008/0127266 A1 | 5/2008 | Ward et al. |
| 2008/0178221 A1 | 7/2008 | Schein et al. |
| 2008/0184296 A1 | 7/2008 | Alten et al. |
| 2008/0184308 A1 | 7/2008 | Herrington et al. |
| 2008/0184312 A1 | 7/2008 | Schein et al. |
| 2008/0184315 A1 | 7/2008 | Ellis et al. |
| 2008/0189744 A1 | 8/2008 | Schein et al. |
| 2008/0216111 A1 | 9/2008 | Alten et al. |
| 2008/0235725 A1 | 9/2008 | Hendricks |
| 2008/0288980 A1 | 11/2008 | Schein et al. |
| 2008/0301733 A1 | 12/2008 | Yuen et al. |
| 2009/0070817 A1 | 3/2009 | Ellis et al. |
| 2010/0211975 A1 | 8/2010 | Boyer et al. |
| 2010/0223643 A1 | 9/2010 | Yuen et al. |

FOREIGN PATENT DOCUMENTS

| | | |
|---|---|---|
| AU | 700302 | 12/1998 |
| AU | 733993 | 2/1999 |
| AU | 701683 | 5/1999 |
| AU | 705839 | 6/1999 |
| AU | 730507 | 3/2001 |
| AU | 743395 | 5/2002 |
| AU | 754696 | 11/2002 |
| AU | 2003200576 | 5/2003 |
| AU | 2004203044 | 7/2004 |
| AU | 2005234652 | 12/2005 |
| BR | 9609120 | 8/1999 |
| BR | 9608903 | 9/1999 |
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2190744 | 11/1995 |
| CA | 2362627 | 11/1995 |
| CA | 2362630 | 11/1995 |
| CA | 2363051 | 11/1995 |
| CA | 2363052 | 11/1995 |
| CA | 2548637 | 11/1995 |
| CA | 2662685 | 11/1995 |
| CA | 2200348 | 3/1996 |
| CA | 2466894 | 10/1996 |
| CA | 2223018 | 12/1996 |
| CA | 2223057 | 12/1996 |
| CA | 2274560 | 6/1998 |
| CA | 2581116 | 6/1998 |
| CA | 2297039 | 1/1999 |
| CA | 2312326 | 6/1999 |
| CN | 1244990 | 2/2000 |
| CN | 1555191 | 12/2004 |
| CN | 1567986 | 1/2005 |

| | | | | | | |
|---|---|---|---|---|---|---|
| DE | 2918846 | 11/1980 | | FR | 2726718 | 5/1996 |
| DE | 3021203 | 12/1981 | | GB | 1 554 411 | 10/1979 |
| DE | 3246225 | 6/1984 | | GB | 2034995 | 6/1980 |
| DE | 3337204 | 4/1985 | | GB | 2126002 | 3/1984 |
| DE | 3640436 | 6/1988 | | GB | 2185670 | 7/1987 |
| DE | 3621263 | 7/1988 | | GB | 2256546 | 12/1992 |
| DE | 3909334 | 9/1990 | | GB | 2 264 409 | 8/1993 |
| DE | 4201031 | 7/1993 | | GB | 2309134 | 7/1997 |
| DE | 4217246 | 12/1993 | | HK | 1023018 | 5/2004 |
| DE | 4240187 | 6/1994 | | HK | 1013781 | 2/2005 |
| DE | 4407701 | 9/1995 | | HK | 1035285 | 3/2005 |
| DE | 4437928 | 10/1995 | | HK | 1061496 | 5/2010 |
| DE | 4427046 | 2/1996 | | JP | 58-137334 | 8/1983 |
| DE | 4440419 | 5/1996 | | JP | 58-137344 | 8/1983 |
| DE | 19531121 | 2/1997 | | JP | 58-196738 | 11/1983 |
| DE | 19740079 | 3/1999 | | JP | 58-210776 | 12/1983 |
| DE | 19931046 | 1/2001 | | JP | 59-123670 | 7/1984 |
| DE | 69723999 | 6/2004 | | JP | 59-138461 | 8/1984 |
| EP | 0 239 884 | 10/1987 | | JP | 59-141878 | 8/1984 |
| EP | 0 276 425 | 8/1988 | | JP | 60-061935 | 4/1985 |
| EP | 0 337 336 | 10/1989 | | JP | 60-071260 | 4/1985 |
| EP | 0 339 675 | 11/1989 | | JP | 61-050470 | 3/1986 |
| EP | 0 393 555 | 10/1990 | | JP | 61-074476 | 4/1986 |
| EP | 0 396 062 | 11/1990 | | JP | 62-060370 | 3/1987 |
| EP | 0 401 930 | 12/1990 | | JP | 62-060384 | 3/1987 |
| EP | 0 408 892 | 1/1991 | | JP | 63-92177 | 4/1988 |
| EP | 0 420 123 | 4/1991 | | JP | 63 234679 | 9/1988 |
| EP | 0 424 648 | 5/1991 | | JP | 01-307944 | 12/1989 |
| EP | 0 444 496 | 9/1991 | | JP | 02-048879 | 2/1990 |
| EP | 0 447 968 | 9/1991 | | JP | 02-119307 | 5/1990 |
| EP | 0 532 322 | 3/1993 | | JP | 03-063990 | 3/1991 |
| EP | 0 550 911 | 7/1993 | | JP | 03-214919 | 9/1991 |
| EP | 0 554 577 | 8/1993 | | JP | 03-243076 | 10/1991 |
| EP | 0 560 593 | 9/1993 | | JP | 04-079053 | 3/1992 |
| EP | 0 572 090 | 12/1993 | | JP | 04-162889 | 6/1992 |
| EP | 0 624 040 | 11/1994 | | JP | 04-180480 | 6/1992 |
| EP | 0624039 | 11/1994 | | JP | 04-227380 | 8/1992 |
| EP | 0 682 452 | 11/1995 | | JP | 4-335395 | 11/1992 |
| EP | 0 721 253 | 7/1996 | | JP | 05-183826 | 7/1993 |
| EP | 0 723 369 | 7/1996 | | JP | 05-260400 | 10/1993 |
| EP | 0 725 539 | 8/1996 | | JP | 05-284437 | 10/1993 |
| EP | 0 742 669 | 11/1996 | | JP | 05-339100 | 12/1993 |
| EP | 0 752 767 | 1/1997 | | JP | 06-021907 | 1/1994 |
| EP | 0 753 964 | 1/1997 | | JP | 06-038165 | 2/1994 |
| EP | 0 762 751 | 3/1997 | | JP | 06-133235 | 5/1994 |
| EP | 0 772 360 | 5/1997 | | JP | 06-504165 | 5/1994 |
| EP | 0 774 866 | 5/1997 | | JP | 06-243539 | 9/1994 |
| EP | 0 775 417 | 5/1997 | | JP | 06295312 | 10/1994 |
| EP | 0 784 405 | 7/1997 | | JP | 07-020254 | 1/1995 |
| EP | 0 805 594 | 11/1997 | | JP | 07-050259 | 2/1995 |
| EP | 0 822 718 | 2/1998 | | JP | 07-076592 | 3/1995 |
| EP | 0 880 856 | 2/1998 | | JP | 07-123326 | 5/1995 |
| EP | 0 827 340 | 3/1998 | | JP | 07-135621 | 5/1995 |
| EP | 0 830 787 | 3/1998 | | JP | 07-147657 | 6/1995 |
| EP | 0 834 798 | 4/1998 | | JP | 07-154349 | 6/1995 |
| EP | 0 837 599 | 4/1998 | | JP | 07-160732 | 6/1995 |
| EP | 0 848 554 | 6/1998 | | JP | 07-184131 | 7/1995 |
| EP | 0 849 948 | 6/1998 | | JP | 07-193762 | 7/1995 |
| EP | 0 851 681 | 7/1998 | | JP | 07-284033 | 10/1995 |
| EP | 0 852 361 | 7/1998 | | JP | 07-288759 | 10/1995 |
| EP | 0 852 442 | 7/1998 | | JP | 07-321748 | 12/1995 |
| EP | 0 854 645 | 7/1998 | | JP | 07321748 | 12/1995 |
| EP | 0 854 654 | 7/1998 | | JP | 08-032528 | 2/1996 |
| EP | 0 856 227 | 8/1998 | | JP | 08-032538 | 2/1996 |
| EP | 0 880 856 | 12/1998 | | JP | 08-044268 | 2/1996 |
| EP | 0 905 985 | 3/1999 | | JP | 08-111823 | 4/1996 |
| EP | 0 924 927 | 6/1999 | | JP | 08-125497 | 5/1996 |
| EP | 0 935 393 | 8/1999 | | JP | 08-137334 | 5/1996 |
| EP | 0 944 253 | 9/1999 | | JP | 08-506469 | 7/1996 |
| EP | 0 945 003 | 9/1999 | | JP | 08-506941 | 7/1996 |
| EP | 0 963 119 | 12/1999 | | JP | 08506469 | 7/1996 |
| EP | 0 988 876 | 3/2000 | | JP | 08-196738 | 8/1996 |
| EP | 1 036 466 | 9/2000 | | JP | 08-251122 | 9/1996 |
| EP | 1 095 504 | 5/2001 | | JP | 08-275077 | 10/1996 |
| EP | 1 152 605 | 11/2001 | | JP | 09-037151 | 2/1997 |
| EP | 1 361 751 | 11/2003 | | JP | 09-37168 | 2/1997 |
| EP | 1 763 234 | 3/2007 | | JP | 09-037172 | 2/1997 |
| FR | 2662805 | 12/1991 | | JP | 09-102827 | 4/1997 |
| FR | 2662895 | 12/1991 | | JP | 09-141878 | 6/1997 |

| | | | | | | |
|---|---|---|---|---|---|---|
| JP | 09247565 | 9/1997 | | WO | WO 96/07270 | 3/1996 |
| JP | 10-143340 | 5/1998 | | WO | WO 96/08109 | 3/1996 |
| JP | 10-143349 | 5/1998 | | WO | WO 96/08113 | 3/1996 |
| JP | 10-512420 | 11/1998 | | WO | WO 96/09721 | 3/1996 |
| JP | 02-838892 | 12/1998 | | WO | WO 96/13013 | 5/1996 |
| JP | 11-259248 | 9/1999 | | WO | WO 96/13932 | 5/1996 |
| JP | 2001-213595 | 8/2001 | | WO | WO 96/13935 | 5/1996 |
| JP | 2001-513595 | 9/2001 | | WO | WO 96/17467 | 6/1996 |
| JP | 03-228754 | 11/2001 | | WO | WO 96/17473 | 6/1996 |
| JP | 2002-506328 | 2/2002 | | WO | WO 96/21990 | 7/1996 |
| JP | 2002-513255 | 5/2002 | | WO | WO 96/26605 | 8/1996 |
| JP | 2002-279969 | 9/2002 | | WO | WO 96/27270 | 9/1996 |
| JP | 2003-189200 | 7/2003 | | WO | WO 96/27982 | 9/1996 |
| JP | 2003-264750 | 9/2003 | | WO | WO 96/27989 | 9/1996 |
| JP | 03-512195 | 3/2004 | | WO | WO 96/31980 | 10/1996 |
| JP | 2005-102342 | 4/2005 | | WO | WO 96/34467 | 10/1996 |
| JP | 2007-184947 | 7/2007 | | WO | WO 96/34486 | 10/1996 |
| JP | 04-062577 | 3/2008 | | WO | WO 96/34491 | 10/1996 |
| JP | 04-083525 | 4/2008 | | WO | WO 96/37996 | 11/1996 |
| JP | 04-382116 | 12/2009 | | WO | WO 96/38799 | 12/1996 |
| JP | 04-415032 | 2/2010 | | WO | WO 96/38962 | 12/1996 |
| JP | 04-415033 | 2/2010 | | WO | WO 96/41471 | 12/1996 |
| JP | 04-415034 | 2/2010 | | WO | WO 96/41477 | 12/1996 |
| JP | 04-512618 | 7/2010 | | WO | WO 96/41478 | 12/1996 |
| JP | 04-564839 | 10/2010 | | WO | WO97/02702 | 1/1997 |
| TW | 306099 | 5/1997 | | WO | WO 97/02702 | 1/1997 |
| WO | WO 86/01359 | 2/1986 | | WO | WO 97/04595 | 2/1997 |
| WO | WO 86/01962 | 3/1986 | | WO | WO 97/07656 | 3/1997 |
| WO | WO 87/03766 | 6/1987 | | WO | WO 97/13368 | 4/1997 |
| WO | WO 88/04057 | 6/1988 | | WO | WO 97/17774 | 5/1997 |
| WO | WO 88/04507 | 6/1988 | | WO | WO97/17774 | 5/1997 |
| WO | WO 89/02682 | 3/1989 | | WO | WO 97/18675 | 5/1997 |
| WO | WO 89/03085 | 4/1989 | | WO | WO 97/26612 | 7/1997 |
| WO | WO 89/12370 | 12/1989 | | WO | WO 97/31480 | 8/1997 |
| WO | WO 90/01243 | 2/1990 | | WO | WO 97/41673 | 11/1997 |
| WO | WO 90/15507 | 12/1990 | | WO | WO 97/42763 | 11/1997 |
| WO | WO 91/00670 | 1/1991 | | WO | WO 97/45786 | 12/1997 |
| WO | WO 91/05436 | 4/1991 | | WO | WO 97/48230 | 12/1997 |
| WO | WO 91/06367 | 5/1991 | | WO | WO 97/49237 | 12/1997 |
| WO | WO 91/18476 | 11/1991 | | WO | WO 97/49241 | 12/1997 |
| WO | WO 92/04801 | 3/1992 | | WO | WO 97/49242 | 12/1997 |
| WO | WO 93/04473 | 3/1993 | | WO | WO 97/50251 | 12/1997 |
| WO | WO 93/05452 | 3/1993 | | WO | WO 98/06219 | 2/1998 |
| WO | WO 93/11638 | 6/1993 | | WO | WO 98/10589 | 3/1998 |
| WO | WO 93/11639 | 6/1993 | | WO | WO98/16062 | 4/1998 |
| WO | WO 93/11640 | 6/1993 | | WO | WO 98/16062 | 4/1998 |
| WO | WO 93/23957 | 11/1993 | | WO | WO 98/17063 | 4/1998 |
| WO | WO93/23957 | 11/1993 | | WO | WO 98/17064 | 4/1998 |
| WO | WO 94/13107 | 6/1994 | | WO | WO98/17064 | 4/1998 |
| WO | WO 94/14280 | 6/1994 | | WO | WO 98/20675 | 5/1998 |
| WO | WO 94/14281 | 6/1994 | | WO | WO 98/21664 | 5/1998 |
| WO | WO 94/14282 | 6/1994 | | WO | WO 98/21877 | 5/1998 |
| WO | WO 94/14283 | 6/1994 | | WO | WO 98/26569 | 6/1998 |
| WO | WO 94/14284 | 6/1994 | | WO | WO 98/26584 | 6/1998 |
| WO | WO 94/21085 | 9/1994 | | WO | WO 98/27723 | 6/1998 |
| WO | WO 94/23383 | 10/1994 | | WO | WO 98/28906 | 7/1998 |
| WO | WO 94/29811 | 12/1994 | | WO | WO 98/31148 | 7/1998 |
| WO | WO 95/01056 | 1/1995 | | WO | WO 98/41020 | 9/1998 |
| WO | WO 95/01057 | 1/1995 | | WO | WO 98/43183 | 10/1998 |
| WO | WO 95/01058 | 1/1995 | | WO | WO 98/47279 | 10/1998 |
| WO | WO 95/01059 | 1/1995 | | WO | WO98/47279 | 10/1998 |
| WO | WO 95/06389 | 3/1995 | | WO | WO 98/48566 | 10/1998 |
| WO | WO 95/07003 | 3/1995 | | WO | WO98/56173 | 10/1998 |
| WO | WO 95/10910 | 4/1995 | | WO | WO 98/56172 | 12/1998 |
| WO | WO 95/15649 | 6/1995 | | WO | WO98/56172 | 12/1998 |
| WO | WO 95/15657 | 6/1995 | | WO | WO 98/56173 | 12/1998 |
| WO | WO 95/15658 | 6/1995 | | WO | WO 99/01984 | 1/1999 |
| WO | WO 95/16568 | 6/1995 | | WO | WO 99/04561 | 1/1999 |
| WO | WO 95/19092 | 7/1995 | | WO | WO99/07142 | 2/1999 |
| WO | WO 95/26608 | 10/1995 | | WO | WO 99/07142 | 2/1999 |
| WO | WO 95/28055 | 10/1995 | | WO | WO 99/14947 | 3/1999 |
| WO | WO 95/28799 | 10/1995 | | WO | WO 99/18722 | 4/1999 |
| WO | WO 95/30961 | 11/1995 | | WO | WO99/18722 | 4/1999 |
| WO | WO 95/31069 | 11/1995 | | WO | WO 99/29109 | 6/1999 |
| WO | WO 95/32583 | 11/1995 | | WO | WO 99/30491 | 6/1999 |
| WO | WO 95/32585 | 11/1995 | | WO | WO 99/31480 | 6/1999 |
| WO | WO95/32585 | 11/1995 | | WO | WO 99/45700 | 9/1999 |
| WO | WO 95/32587 | 11/1995 | | WO | WO 99/45701 | 9/1999 |
| WO | WO 95/32957 | 12/1995 | | WO | WO 99/45702 | 9/1999 |

| | | |
|---|---|---|
| WO | WO 99/52285 | 10/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 00/04706 | 1/2000 |
| WO | WO 00/04708 | 1/2000 |
| WO | WO 00/05889 | 2/2000 |
| WO | WO 00/11865 | 3/2000 |
| WO | WO 00/13415 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/35662 | 5/2001 |
| WO | WO 01/89213 | 11/2001 |
| WO | WO 02/31731 | 4/2002 |
| WO | WO 02/084992 | 10/2002 |

OTHER PUBLICATIONS

U.S. Appl. No. 09/332,244, filed Jun. 11, 1999, Ellis et al.
U.S. Appl. No. 09/356,632, filed Jul. 16, 1999, Rudnick et al.
"A Financial Times Survey: Viewdata (Advertisement)," Financial Times, Mar. 20, 1979.*.
"BBC Online—Schedules" selected pages from the web site. This web site is located at http://www.bbc.co.uk/schedules/ (as printed from the Internet on Oct. 19, 1999 and being dated as early as May 24, 1997).*.
"Development Study and Research Report on New Media Interface Technology: Status & Issues Related to Combining Databases & New Media," Japan Society of Data Communication, Mar. 1986.*.
"Dialing the printed page" ITT in Europe Profile, 11/Spring 1977.*.
"Electronic Program Guide via Internet," Research Disclosure, Kenneth Mason Publications, Hampshire, GB Nr. 385 (May 1996) p. 276, ISSN:0374-4353.*.
"Growing US interest in the impact of viewdata," Computing Weekly, Jul. 20, 1978.*.
"Multimedia Terminal as Terminal Device," Periodical Funkschau, vol. 6/96 of Mar. 1, 1996, pp. 1-9.*.
"Teletext presents the alternative view," Financial Times, Oct. 24, 1977.*.
"Three men on a Viewdata bike," The Economist, Mar. 25, 1978.*.
"Using StarSight 2," Instruction Manual, StarSight Telecast, Inc., Starsight CB 1500 Customer Letter, 1994.
"UVSG Offers System-Specific Web Site Development for OPS," press release of United Video Satellite Group, Apr. 12, 1996.*.
"UVSG Teams With Microsoft on Internet Information Server," press release of United Video Satellite Group, Feb. 22, 1996.*.
"Viewdata and its potential impact in the USA: Final Report/vol. One, The UK Experience," Link and Butler Cox & Partners Limited, Oct. 1978.*.
"Viewdata moves in US but GEC may lose out," Computing Weekly, Jan. 25, 1978.*.
"Viewdata Service Terminal Specification," British Post Office, Issue 5, Aug. 1978.*.
"'Duck Tales,'(1987)[TV Series 1987-1990]," Internet Movie Database (IMDB) [Retrieved on Apr. 7, 2007].
"Addressable Converters: A New Development at CableData," Via Cable, vol. 1, No. 12, Dec. 1981.
"Bell Atlantic Buys Cable TV Company for $22bn," Financial Times (London), Oct. 14, 1993, p. 65.
"Cable Television Equipment," Jerrold Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986.

Creation-Modification of the Audio Signal Processor Setup for a PC Audio Editor, IBM Technical Disclosure Bulletin, vol. 30, No. 10, Mar. 1988, pp. 367-376.
"D2B-Home Bus Für Audio and Video," Selektor, Apr. 1990, pp. 10, 12.
"Dial M for Movie", Funkschau Nov. 1994 Perspektiven, Video on Demand, pp. 78-79. (with English language translation).
"Digital Video Broadcasting (DVB); DVB specification for data broadcasting," European Telecommunication Standards Institute, Draft EN 301 192 V1.2.1 (1999-2001).
"Enhanced Content Specification," "ATVEF," from the internet at http:--www.atvef.com-library-spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987(Unknown author).
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
"Lists> What's on Tonite! TV Listings (fwd)," Internet article (on line), Jan. 28, 1995, XP 002378869 [Retrieved on Apr. 28, 2006].
"MSI Datacasting Systems," TV Communications Journal, Jan. 1973.
"Open TV fur interaktives Fernsehen," Trend and Technik, Sep. 1995 RFE, p. 100. (with English language translation).
"Open TV Launches OpenStreamer™ Technology for Broadcasters to Deliver First Ever Real-Time Digital Interactive Television," from the internet at http:--www.opentv.com-news-openstreamer_press_final.htm, printed on Jun. 28, 1999, the document bears a copyright date of 1999.
"Prevue Networks and OpenTV(R) Agree to Work Together on Deploying Interactive Program Guides Worldwide," from the internet at http:--www.opentv.com-news-prevuefinal.htm, printed on Jun. 28, 1999.
"Probe XL Brochure, Auto Tote Systems Inc.," (Newark, Delaware) (undated) 57 pgs.
"Rewind, reply and unwind with new high-tech TV devices," by Lawrence J. Magid, LA Times. This document was printed from the internet on Jun. 6, 1999 and bears a date of May 19, 1999.
"TV Guide Online Set for Fall", Entertainment Marketing Letter, Aug. 1994.
"TV Listings Functional Spec.," Time Video Information Services, Inc., undated.
272OR Satellite Receiver User's Guide, General Instrument, 1991, pp. 58-61.
ACM Multimedia 93 Proceedings, A Digital On-Demand Video Service Suporting Content-Based Queries, Little et al. pp. 427-436, Jul. 1993.*.
Advertisement (definition), Webster's II New Riverside University Dictionary. Houghton Mifflin Company, 1994.*.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Armstrong, Larry, "Channel-Surfing's next wave: Henry Yuen's interactive TV guide takes on TCI and Viacom," BusinessWeek, Jul. 31, 1995.*.
Arnold, William F., "Britain to get wired city—via telephone," Electronics, Mar. 4, 1976, at 76.*.
Bach, U. et al. "Multimedia TV Set, Part 2 and Conclusion," Radio-Fernsehen Elektronik (RFE), Oct. 1996, pp. 38-40. (English language translation attached.)*.
Bach, U. et al., "Multimedia TV Set, Part 1" Radio/Fernsehen Elektronik (RFE), Sep. 1996, pp. 28, 30, 31. (English language translation attached.)*.

Baer, R.H, "Innovative Add-On TV Products," IEEE Transactions on Consumer Electronics, vol. CE-25, Nov. 1979, pp. 765-771.

Baer, R.H., "Tele-Briefs: A Novel User-Selectable Real Time News Headline Service for Cable TV," IEEE Transactions on Consumer Electronics, vol. CE-25, No. 3, Jul. 1979, pp. 406-408.*.

Bensch, U., "VPV Videotext Programs Videorecorder," IEEE Paper, Jun. 1988, pp. 788-792.

Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.

Blahut et al., "Interactive Television," Proceedings of the IEEE, Jul. 1995.*.

Boyd-Merritt, Rick, "Television wires two-way video," Electronic Engineering Times, Apr. 25, 1994.*.

Brochure, "A New Approach to Addressability," CableData, undated.

Brochure, "Westar and Videotoken Network Present the CableComputer," Revised Aug. 15, 1985 (Plainitff's 334).

Brochure, Time Inc.,"Now, Through the Advances of the Computer Age, You Can Get the Information You Want, When You Want It. Instantly and Conveniently, on Your Home TV Screen," Time Teletext, Time Video Information Services, Inc., undated (V 79167-79175).

Brochure, VTN "Videotoken Network, New Dimension Television," Dec. 1985 (Plaintiffs Exhibit 313).

Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.

Cable Computer User's Guide, Rev. 1, Dec. 1985 (Plaintiffs Exhibit 289).

CableData, Roseville City Council Presentation, Mar. 13, 1985 (Defendant's Exhibit 226).

Carne, E.B., "The Wired Household," IEEE Spectrum, vol. 16 No. 10, Oct. 1979, pp. 61-66.

Chan, Patrick P., "Learning Considerations in User Interface Design: The Room Model," Publication of the Software Portability Laboratory, University of Waterloo, Ontario, Canada, Jul. 1984.

Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.

Office Actions and Corresponding Replies in relation to U.S. Publication No. 2003/0196201.*.

Office Actions and Corresponding Replies in relation to U.S. Publication No. 2006/0277574.*.

Office Actions and Corresponding Replies in relation to U.S. Publication No. 2011/0041150.*.

Office Actions and Corresponding Replies in relation to U.S. Appl. No. 13/083,211.*.

Office Actions and Corresponding Replies in relation to U.S. Patent No. 7,480,929.*.

Office Actions and Corresponding Replies in relation to U.S. Publication No. 2003-0164858.*.

Office Actions and Corresponding Replies in relation to U.S. Patent No. 7,493,641*.

Office Actions and Corresponding Replies in relation to U.S. Patent No. 7,552,459.*.

Office Actions and Corresponding Replies in relation to U.S. Patent No. 7,421,724.*.

Office Actions and Corresponding Replies in relation to U.S. Publication No. 2008/0127263.*.

Office Actions and Corresponding Replies in relation to U.S. Publication No. 2008/0127264.*.

Office Actions and Corresponding Replies in relation to U.S. Appl. No. 13/083,204.*.

Office Actions and Corresponding Replies in relation to U.S. Patent No. 7,797,712.*.

Office Actions and Corresponding Replies in relation to U.S. Appl. No. 12/855,165.*.

Cox, J. et al., "Extended Services in a Digital Compression System," Proceedings from Eleven Technical Sessions: 42nd Annual Convention and Exposition of the National Cable Television Association, Jun. 1993, pp. 185-191.

Damouny, N.G., "Teletext Decoders—Keeping Up With the Latest Advances," IEEE Transactions on Consumer Electronics, vol. CE-30, No. 3, Aug. 1984, pp. 429-435.

Day, Rebecca, "The Great PC/TV Debate," OEM Magazine, Jul. 1, 1996.*.

Declaration Under 37 C.F.R. § 1.132 of Richard E. Glassberg, signed Oct. 20, 2006, filed Oct. 24, 2006, from U.S. Appl. No. 10/346,266.

DIRECTV Plus2 System, Thompson Consumer Electronics, Inc. (1999).*.

DiRosa, S. "BIGSURF Netguide", Jul. 1995, vol. 3.1 (Sections 18,21, and 28—renumbered as pp. 1-27).

Edwardson, S.M., & Gee, A., "CEEFAX: A Proposed New Broadcasting Service," Journal of the SMPTE, Jan. 1974, vol. 83 No. 1, pp. 14-19.

Eitz, Gerhard, "Zukünftige Informations-und Datenangebote beim digitalen Fernsehen—EPG Und 'Lesezeichen'," RTM Rundfunktechnische Mitteilungen, Jun. 1997, vol. 41, pp. 67-72.

European Search Report dated Nov. 11, 2002 from European Application No. 98 94 4611.*.

European Telecommunication Standard, Electronic Programme Guide (EPG); Protocol for a TV Guide using electronic data transmission, by European Telecommunication Standards Institute, Valbonne, France, publication No. ETS 300 707 date of May 1997.

Hartwig, Rautenberg, Bollmann, "Broadcasting and Processing of Program Guides for Digital TV," SMPTE Journal, pp. 727-732, Oct. 1997.

Hedger, J., "Telesoftware: Home Computing Via Broadcast Teletext," IEEE Transactions on Consumer Electronics, vol. CE-25, No. 3, Jul. 1979, pp. 279-287.

Hiroshi Ishii et al., "Clearface: Translucent Multiuser Interface for TeamWorkStation," ECSCW, Sep. 1991, pp. 6-10.

Hiroshi Ishii et al., "Toward an Open Shared Workspace: Computer and Video Fusion Approach of Team Workstation," Communications of the ACM, Dec. 1991, vol. 34 No. 12, pp. 37-50.

Hirotada Ueda et al., "Impact: An Interactive Natural-Motion-Picture Dedicated Multi-Media Authoring System," Communications of the ACM, Mar. 1991, pp. 343-350.

Hobbes Internet Timeline, Mar. 22, 2007.*.

Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.

Holland, Gary L., "NAPLPS standard defines graphics and text communications," EDN, Jan. 10, 1985, at 179.*.

Iizuka, Honbashi, Kuwana, "The Overview of Internet TV Guide Japan," Building Internet TV Guide Service 1 and 2, the 53rd National Conference Proceedings, Japan, Information Processing Society of Japan, Sep. 6, 1996 p. 3-227 to 230 (partial English language translation.*.

Installation Guide, "Getting Started 1" Manual, and Remote Control "Quick Reference Guide.".

Instructional Manual, "Sonic the Hedgehoge," Sega of America, 1992.

International Search Report, Internatonal Application No. PCT-US97-23852, Jun. 1, 1998, 2 pages.

James Sorce, David Fay, Brian Raila and Robert Virzi, "Designing a Broadband Residential Entertainment Service: A Case Study," GTE Laboratories Incorporated, undated, pp. 141-148.

James, A., "Oracle—Broadcasting the Written Word," Wireless World, Jul. 1973, vol. 79 No. 1453, pp. 314-316.

Judice, C.N., "Move Over Cable, Here Comes Video Via Voice Lines," Network World, Sep. 1986, p. 26.

Kai et al, "Development of a Simulation System for Integrated Services Television," Report from Information Processing Society of Japan, Japan, Sep. 13, 1996, vol. 96, No. 90 pgs.*.

Karstad, K.,"Microprocessor Control for Color-TV Receivers," IEEE Transactions on Consumer Electronics, vol. CE-26, May 1980, pp. 149-155.

Keith Lynch's timeline of net related terms and concepts, Mar. 22, 2007.*.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Large, Peter, "Throw away the books—Viewdata's coming," Guardian, Jan. 10, 1978.*.
Large, Peter, "Viewdata, the invention that brings boundless advice and information to the home, also sets a test for the Post Office," Financial Guardian, Jun. 29, 1978.*.
Leftwich, Jim and Schein, Steve, "StarSight Interactive Television Program Guide III" Functional-Interactional Architecture Specification Document, Orbit Interaction, Palo alto, California, Published before Apr. 19, 1995.
Listing of computer code for operating system within the Cable Computer in 1985 (Plaintiff's Exhibit 298).
Listing of computer code for Video HTU Program (Plaintiff's Exhibit 299).
Lloyd, John, "Impact of technology," Financial Times, Jul. 1978.*.
Lowenstein, R.L. and Aller, H.E., "The Inevitable March of Videotex," Technology Review, vol. 88, Oct. 1985, p. 22.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
M-A-COM, Inc., "Videocipher II Satellite Descrambler Owner3 s Manual," dated Feb. 1986, pp. 1-24.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell, R.G., "Tac Timer," 1986 NCTA Technical Papers, pp. 203-206.
Miller, Matthew D., "A Scenario for the Deployment of Interactive Multimedia Cable Television Systems in the United States in the 1990s," IEEE, 1994.*.
Money, Steve A., "Teletext and Viewdata," Butterworth & Co. Ltd., London, 1979.*.
Mosley, J.D., "NAPLPS chip sets, though scarce, satisfy limited US videotex demand," EDN, Mar. 21, 1985, at 57.*.
Neumann, Andreas, "WDR Online Aufbau and Perspektiven Automatisierter Online-Dienste im WDR," RTM Rundfunktechnische Mitteilungen, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Other than (definition), The American Heritage® Dictionary of Idioms by Christine Ammer. Houghton Mifflin Company, retrieved on Jul. 9, 2007. <Dictionary.com http://dictionary.reference.com/browse/other_than>.*.
Owen, Kenneth, "How dial-a-fact is coming closer to home," The Times, Sep. 30, 1977.*.
Owen, Kenneth, "Why the Post Office is so excited by its plans for a TV screen information service," The Times, Sep. 26, 1976.*.
Pfister, Larry T., "Teletext: Its Time Has Come," Prepared for the IGC Videotext—Teletext Conference, Andover, Massachusettes, Dec. 14, 1982, pp. 1-11.
Poole, James, "Demand for Viewdata grows," Sunday Times, Feb. 10, 1977.*.
Prevue Guide Brochure, Spring 1984.*.
Prevue Guide Brochure, Spring 1994.
Printout from Google News Archives, Mar. 22, 2007.*.
Prodigy Launches Interactive TV Listing, Apr. 22, 1994 public Broadcasting Report.
Qayyum, Hamid, "Using IVDS and VBI for Interactive Television," IEEE, Jun. 10, 1996.*.

Rajapakshe et al., "Video on demand," (last modified Jun. 1995) <http://www-dse.doc.ic.ac.uk/~nd/suprise_95 /Journal/vol4/shr/report.html>*.
Rath et al., "Set-Top Box Control Software: A Key Component in Digital Video," Philips Journal of Research, vol. 50, No. 1/2 1996, at 185.*.
Rayers, D.J., "Telesoftware by Teletext," 1984 IEEE Conference Papers, vol. 240, p. 323.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Rosch, Gary D., "New data and information system set for commercial market trial," Telephony, Mar. 20, 1978, at 96.*.
Ross Peddicord, "New on TV: You Bet Your Horse," The Sun, Baltimore Maryland Dec. 15, 1994, 1 pg.
Ruffler et al., "InfoRadio on Demand, WebTV and digiTaz—Telecommerce Case Studies," May 23, 1996.*.
Ryan, Margaret, "Interactive TV Takes a Corporate Twist," Electronic Engineering Times, Jul. 10, 1995.*.
Schlender, B.R., "Couch Potatoes! Now It's Smart TV," Fortune, Nov. 20, 1989, pp. 111-116.
Schmuckler, Eric "A marriage that's made in cyberspace (television networks pursue links with online information services)," May 16, 1994 MEDIAWEEK, v. 4, No. 20, p. 22(3).
Sealfon, Peggy, "High Tech TV," Photographic, Dec. 1984.
Sharpless et al., "An advanced home terminal for interactive data communication," Conf. Rec. Int. Conf. Commun. ICC '77, IEEE, Jun. 12-15, 1977, at 19.647.*.
St. John, Sandringham, "Dress rehearsal for the PRESTEL show," New Scientist, Jun. 1, 1978, at 586.*.
StarSight Interactive Television Program Guide IV, Jim Leftwich and Steve Schein, Functional/ Interactional Architecture Specification Document, Orbit Interaction, Palo Alto, California, Published before Apr. 19, 1995.*.
Statement in an Examination Report dated Aug. 2, 1999 for a counterpart foreign application filed in New Zealand in which the foreign Examiner alleges that he has used "the Internet to access television listings for BBC World television as far back as mid 1996 . . . "*.
Stickland, D.C., "It's a common noun," The Economist, Jun. 5, 1978.*.
Stokes, Adrian, "The viewdata age: Power to the People," Computing Weekly, Jan. 1979.*.
Sunada, K. et al., "Teletext Color Television Receiver Model C-29M950, C26M940," NEC Home Electronics, NEC Giho, 1987.
Supplemental European Search Report for Application No. EP 98 93 5889, completed on Sep. 28, 2001.*.
Supplemental European Search Report, Application No. EP 97 92 5449, Nov. 1999, 2 pages.*.
Sussman, A. "GTE Tunes in to Home TV Shopping," PC Week, Jun. 28, 1988, p. C15.
Tech Notes: Product Updates from M-A-COM Cable Home Group, "Videocipher Owner's Manual Update," Issue No. 6, Feb. 1986.
Technical White Paper, "Open TV™ Operating Environment," (© 1998 OpenTV Inc.), pp. 1-12.
Technological Examination & Basic Investigative Research Report on Image Databases, Japan Mechanical Engineering Organization Int'l Society for the Advancement of Image Software, Japan, Mar. 1988.
Technology: Turn on, tune in and print out—An experimental interactive television service is set to alter our viewing habits, Financial Times (London), Oct. 14, 1993, p. 11.
The clickTV television program guide website of TVData of Queensbury, New York. This website is located at www.clicktv.com (as printed from the Internet on Aug. 13, 1997).*.
The InfoBeat television program guide website of InfoBeat, Inc. This website is located at www.infobeat.com (as printed from the Internet on Dec. 8, 1997).*.

The New Media and Broadcast Policy: An Investigation & Research Conference Report on Broadcasting Diversifiation, Radio Regulatory Bureau, Japan Ministry of Posts & Telecommunications, Mar. 1982.

The television program guide website of Gist Communications, Inc. of New York, New York. This website is located at www.gist.com (as printed from the Internet on Aug. 14, 1997).*.

The television program guide website of TV Guide Entertainment Network. This website is located at www.tvguide.com (as printed from the Internet on Aug. 14-22, 1997).*.

Transcript of the Deposition of John Roop, Jun. 2001, p. 608.*.

Transcript of the Deposition of John Roop, Oct. 1996, pp. 186-187.

Trial testimony of Michael Axford, Prevue Interactive, Inc. and United Video Satellite Group, Inc. v. Starsight Telecast, Inc., May 9, 1998, pp. 186-187, 295-315, and 352-357.

TV Guide movie database Internet web pages printed on Aug. 12, 1999 (9 pages).*.

Various publications of Insight Telecast, 1992 and 1993.

Veith, R.H., "Television's Teletext," Elsivier Science Publishing Co., Inc, 1983, pp. 13-20, 41-51.

Videocipher Stipulation, May 1996.

Videoguide User's Manual, pp. 1-27 (p. 11 is the most relevant), 1995.*.

VideoGuide, "VideoGuide User's Manual," pp. 1-28 (p. 11 is the most relevant).

W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.

Web TV and Its Consumer Electronics Licensees debut First Internet Television Network and Set Top Box XP 002113265 Retrieved from the Internet: <URL http://www.webtv.net/company/news/archive/License.html> retrieved on Aug. 25, 1999.*.

Whitehorn, Katherine, "Viewdata and you," Observer, Jul. 30, 1978.*.

Wikipedia article on CompuServe, Mar. 22, 2007.*.

Windows 98 Feature Combines TV, Terminal and the Internet, New York Times, Aug. 18, 1998.

Wittig et al.,"Intelligent Media Agents in Interactive Television Systems," Proceedings of the International Conference on Multimedia Computing and Systems, Los Alamitos, CA, US, May 15-18, 1995, pp. 182-189, XP 000603484.

Yee Hsiang Chang et al.., "An Open-Systems Approach to Video on Demand," IEEE Communications Magazine, May 1994, pp. 68-80.

Yoshida, Junko, "Interactive TV a Blur," Electronic Engineering Times, Jan. 30, 1995.*.

"StarSight Interactive Television Program Guide" Jim Leftwich, Willy Lai & Steve Schein Published before Apr. 19, 1995.

Getting Started Installation Guide, "Using StarSight 1" Manual, and Remote Control "Quick Reference Guide."

Instruction Manual "Using StarSight 2" Published before Apr. 19, 1995.

Prevue Networks, Inc. Promotional Materials, 1994.

Office Actions and Corresponding Replies in relation to U.S. Publication No. 2008/0127264.

Office Actions and Corresponding Replies in relation to U.S. Publication No. 2011/0041150.

Office Actions and Corresponding Replies in relation to U.S. Appl. No. 12/855,165.

* cited by examiner

FIG. 1

FIG. 2

METHOD AND SYSTEM FOR DISPLAYING ADVERTISEMENTS BETWEEN SCHEDULE LISTINGS

CROSS-REFERENCE TO RELATED APPLICATIONS

This application is a continuation of U.S. patent application Ser. No. 10/401,301, filed on Mar. 27, 2003, which is a continuation of U.S. patent application Ser. No. 09/284,894, filed on Jul. 13, 1999, now U.S. Pat. No. 6,687,906, which is a 371 of PCT International Application No. PCT/US97/23852, filed on Dec. 19, 1997, which claims the benefit of U.S. Provisional Application No. 60/034,784, filed Dec. 19, 1996, which are hereby incorporated by reference herein in their entireties.

BACKGROUND OF THE INVENTION

This invention relates to electronic program guides that incorporate advertising messages or words.

As the number of television channels available on cable and by satellite expands, an on-screen electronic program guide (EPG) become more indispensable. Such an EPG permits the user to sort the available present and future programming by theme, time, and channel. As a result, the user can find a program of interest more easily.

It is costly to collect EPG data for display and to transmit such data to the consumer. Thus, there is a need to find a way to recover the cost of these activities.

SUMMARY OF THE INVENTION

According to the invention, advertisements are inserted in an EPG on the screen of display monitor between individual television program listings. Specifically, a memory stores EPG data and advertising data. A microprocessor is programmed to recover EPG data corresponding to a number of television programs and advertising date from the memory. The microprocessor controls the monitor to display the recovered EPG data on the screen in lines of television program listings, each television program listing being displayed in a separate line, and to display the recovered advertising data in a line on the screen instead of one of the television program listings.

In a preferred embodiment, the EPG and advertising data are displayed in a first area of the screen and a detail window is displayed in a second area of the screen. One of the lines of EPG data is highlighted with a cursor. A description of the television program listing highlighted by the cursor is inserted in the second area. When the line of advertising data is highlighted with the cursor, a description relating to the advertising data is inserted in the second area.

DETAILED DESCRIPTION OF THE DRAWINGS

The disclosures of U.S. application Ser. No. 08/475 395, filed on Jun. 7, 1995, issued as U.S. Pat. No. 6,239,794, May 29, 2001, and application Ser. No. 08/726,814 filed on Oct. 10, 1956, issued as U.S. Pat. No. 6,028,599, Feb. 22, 2000, are incorporated fully herein by reference. As illustrated in the former application, a source of television signals 10 in FIG. 1 such as a terrestrial antenna, or a cable is connected to a television tuner 11. The output of tuner 11 is a modulated intermediate frequency signal containing video and audio television information. Tuner 11 is connected by an intermediate frequency amplifier (IF AMP) 12 to a picture detector (PICTURE DET) 13 and a sound detector (SOUND DET) 14, which produce base band video and audio signals, respectively. The audio signal is coupled by a sound amplifier (SOUND AMP) 15 to a loudspeaker 16. The video signal is coupled by a video amplifier not shown to one input of a switch 18. Sound detector 14 and picture detector 13 are connected to the audio and video inputs, respectively, of a video cassette recorder (VCR) 17. (Alternatively, television signal source 10 could be directly connected to the RF input of VCR 17, if its internal turner and demodulating circuitry is to be utilized.) The output of VCR 17 is connected to the other input of switch 18. The output of switch 18 is connected to one input of a conventional picture-in-picture (PIP) integrated circuit chip 19. The output of PIP chip 19 is connected to the video input of a television receiver or monitor (TV) 20 having a screen (not shown).

An updatable database of the schedule of program listings of all the available channels for a prescribed period of time, e.g a day or a week, is electronically stored in a program schedule memory 22. These program listings typically include for each program the title, a program description, the day of the week, the start time of the day, the program length, and the channel on which the program is transmitted and thus available for reception at source 10. In a preferred embodiment of the invention, the period of time for which the program listings are stored is different for the guides, depending upon viewer priorities and preferences. For example, the information needed to display the time specific program guide (TISPG) and channel specific program guide (CSPG) may be stored for one or two days and the information needed to display the theme specific program guide (THSPG) may be stored for a week or more. The data base can be updated by a continuous data link in the vertical blanking interval (VBI) of one television channel broadcast to the television receiver in well known fashion. Alternatively, the data base can be updated by unplugging memory 22 and replacing it with a memory having the updated data base. Memory 22 is connected to a microprocessor 24 that is programmed to control the operation of the described equipment. An operating program for microprocessor 24 is stored in a read only memory (ROM) 26. A viewer input device 28, preferably in the form of a remote IR controller, is coupled to microprocessor 24 to provide commands from the viewer. A video processor 30 is coupled to microprocessor 24. When the viewer wishes to see television program listings, microprocessor 24 recalls a portion of the program schedule data base from memory 22 and couples it to video processor 30, where the program listings are formatted for display. Preferably, the information stored in video processor 30 is a bit map of what is displayed on the screen of television receiver 20. Video processor 30 is connected to the other input of PIP chip 19. Preferably, viewer input device 28 controls microprocessor 24 by cursor movement on the screen of television receiver 20. To this end, microprocessor 24 and video processor 30 are coupled to a cursor position register 32. (Alternatively, the viewer can select items of information displayed on the screen by keying into viewer input device 28 code numbers assigned to these items.) Microprocessor 24 is also coupled to tuner 11 for channel change, to VCR 17 for play/record selection and start/stop, to switch 18 for selection for one of its inputs, and to PIP chip 19 for selection of the mode of PIP operation.

Figure 2:
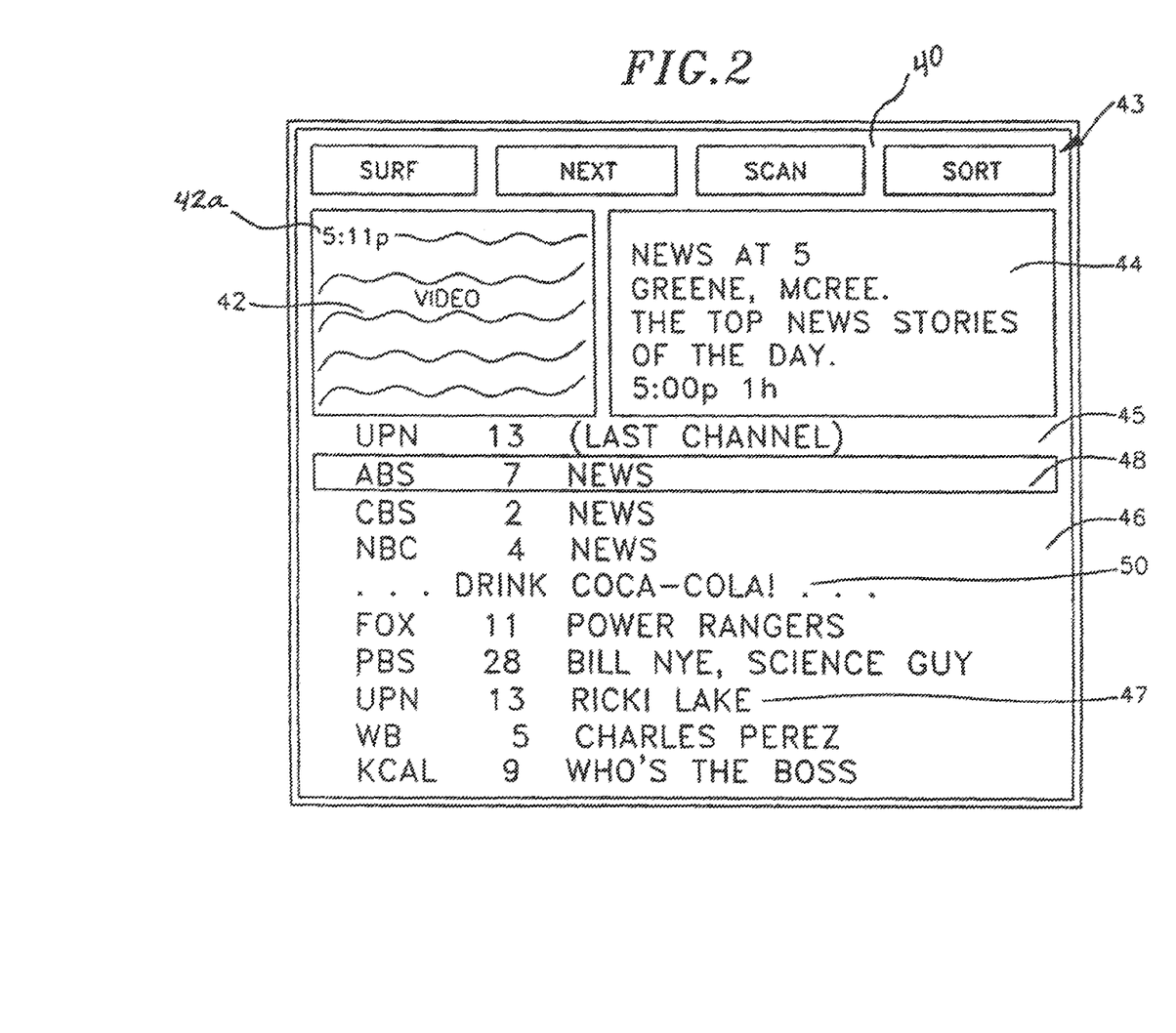
FIG. 2 is a screen format produced by the apparatus of FIG. 1.

The format of the electronic program guide is shown in FIG. 2. The format has a background area 40 and an overlaid PIP window 42 in the upper left-hand corner of the screen. The real time, i.e., 5:11 p.m., is displayed in a sub-area 42a of PIP window 42. Background area 40 includes a banner and message prompting area 43 the top of the screen, a program description area 44 in the upper right-hand corner of the screen adjacent to PIP window 42, and a program schedule area 46 below areas 42 and 44. Program description area 44 includes the start time and length (duration) of the program being described. In area 46, EPG data retrieved from memory 22 is displayed in lines, each program listing being displayed in a separate line. The viewer can move a cursor 48 vertically to highlight one of the lines of program listings displayed in area 46. The highlighted background of cursor 48 and the background of program description area 44 are preferably the same color or shade. The complete, moving images of a currently broadcast television program in real time and the current time are displayed in PIP window 42 and the audio portion of the television program displayed in PIP window 42 is reproduced by the sound system of monitor 20.

Figure 1:
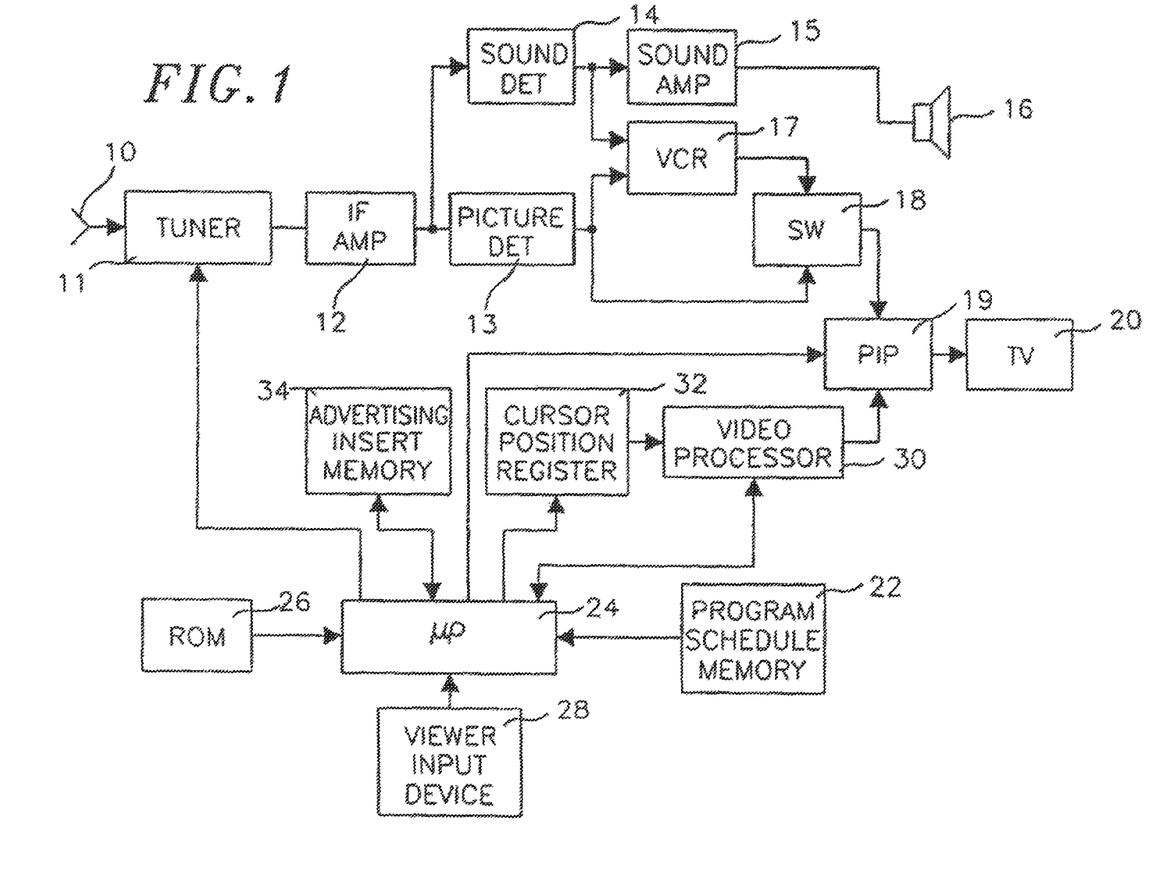
FIG. 1 is a schematic block diagram of apparatus for carrying out the invention.

Advertising inserts are displayed on the screen between the lines of program listings in program schedule area 46 and related information or announcements are displayed in description area 44. With reference to FIG. 1, the advertising inserts are preferably transmitted in the VBI as part of the program schedule information and stored at the television receiver in RAM, represented functional as an advertising insert memory 34. Preferably the inserts are transmitted as part of the packets of information about the programs, i.e. show information packages (SIPs), with which the advertising inserts are displayed. The apparatus of FIG. 1 functions as described in Ser. No. 08/475,395, the advertising inserts being treated as part of the program listings displayed in area 46 and the brief program descriptions displayed in area 44.

In practice, memory 34 and memory 22 could be physically incorporated in a single RAM. Addresses for the advertising inserts could be stored as part of the pre-established time lists for the programs with which the advertising inserts are displayed. Thus, the addresses link the time lists to the advertising inserts, and each advertising insert is only stored once in memory 34. By linking the advertising inserts to the time lists, the displayed advertising insert becomes time dependent. Thus, the content of the displayed advertisements can, to some extent, be directed to the interests of the viewers. Advertisements of interest to housewives would be displayed in the morning and advertisements of interest to children would be displayed in the early evening.

As illustrated in FIG. 2, an advertising insert 50 is preferably displayed as a line below the listing, "NBC 4 NEWS" of the television program that the advertiser, e.g., Coca Cola, sponsors. However, it is not necessary that there be a relationship between the position of the advertiser and the television program, depending on the circumstances. To obtain more information about the subject of advertising insert 50, the viewer highlights the line with cursor 48; then such information is displayed in area 44, instead of information about a television program. For example, the announcement in area 44 could inform the viewer that the advertised product is on sale in articular retail establishment at a particular price or give an more detailed product description.

What is claimed is:

1. A method for simultaneously displaying channel advertisements with an electronic program guide (EPG), the method comprising:

storing schedule information in a program schedule memory for each of a plurality of programs;

storing at least one advertisement in an advertising insert memory, wherein the advertising insert memory is distinct from the program schedule memory;

displaying, on a display, at least a portion of the stored schedule information in a plurality of rows of schedule information, wherein each row of schedule information pertains to a plurality of programs provided on a channel;

accessing an address link in the program schedule memory that links the at least one advertisement in the advertising insert memory to at least one displayed row of schedule information; and displaying, on the display, the at least one linked advertisement from the advertising insert memory adjacent to a row of schedule information from the program schedule memory.

2. The method of claim 1, wherein at least one of the stored advertisements is stored as an address that links to the advertisement.

3. The method of claim 1, wherein:
at least one of the stored advertisements is associated with at least one of the plurality of programs.

4. The method of claim 3, wherein the association between the at least one of the stored advertisements and the at least one of the plurality of programs is based on the scheduled time of the program.

5. The method of claim 3, wherein the association between the at least one of the stored advertisements and the at least one of the plurality of programs is based on sponsorship of the scheduled program.

6. The method of claim 1, wherein at least one of the displayed advertisements is interactive.

7. The method of claim 1, wherein at least one of the displayed advertisements relates to a service or a product.

8. The method of claim 1, further comprising:
highlighting a row of a displayed program schedule information item with a cursor;
displaying a detail window in a second area of the display; and
displaying, in the second area of the screen, information relating to the displayed program schedule information item that was highlighted.

9. The method of claim 1, further comprising:
highlighting a row of a displayed advertisement with a cursor;
displaying a detail window in a second area of the display; and
displaying, in the second area of the screen, information relating to the displayed advertisement that was highlighted.

10. The method of claim 1, wherein:
the portion of the stored program schedule information being displayed relates to a user-selected time,
and the displayed advertisement is independent of the user-selected time.

11. A system for simultaneously displaying channel advertisements with an electronic program guide (EPG), the system comprising:
a program schedule memory for storing schedule information;
an advertising insert memory for storing advertising data, wherein the advertising insert memory is distinct from the program schedule memory;
a display; and
a processor, wherein the system is configured to:

store schedule information in the program schedule memory for each of a plurality of programs, store at least one advertisement in the advertising insert memory, display, on the display, at least a portion of the stored schedule information in a plurality of rows of schedule information, wherein each row of schedule information pertains to a plurality of programs provided on a channel, access an address link in the program schedule memory that links the at least one advertisement in the advertising insert memory to at least one displayed row of schedule information, and display, on the display, the at least one linked advertisement from the advertising insert memory adjacent to a row of schedule information from the program schedule memory.

12. The system of claim 11, wherein at least one of the stored advertisements is stored as an address that links to the advertisement.

13. The system of claim 11, wherein:
at least one of the stored advertisements is associated with at least one of the plurality of programs.

14. The system of claim 13, wherein the association between the at least one of the stored advertisements and the at least one of the plurality of programs is based on the scheduled time of the program.

15. The system of claim 13, wherein the association between the at least one of the stored advertisements and the at least one of the plurality of programs is based on sponsorship of the scheduled program.

16. The system of claim 11, wherein at least one of the displayed advertisements is interactive.

17. The system of claim 11, wherein at least one of the displayed advertisements relates to a service or a product.

18. The system of claim 11, wherein the system is further configured to:
highlight a row of a displayed program schedule information item with a cursor;
display a detail window in a second area of the display; and
display, in the second area of the screen, information relating to the displayed program schedule information item that was highlighted.

19. The system of claim 11, wherein the system is further configured to:
highlight a row of a displayed advertisement with a cursor;
display a detail window in a second area of the display; and
display, in the second area of the screen, information relating to the displayed advertisement that was highlighted.

20. The system of claim 11, wherein:
the portion of the stored program schedule information being displayed relates to a user-selected time,
and the displayed advertisement is independent of the user-selected time.

* * * * *